Patented Nov. 28, 1950

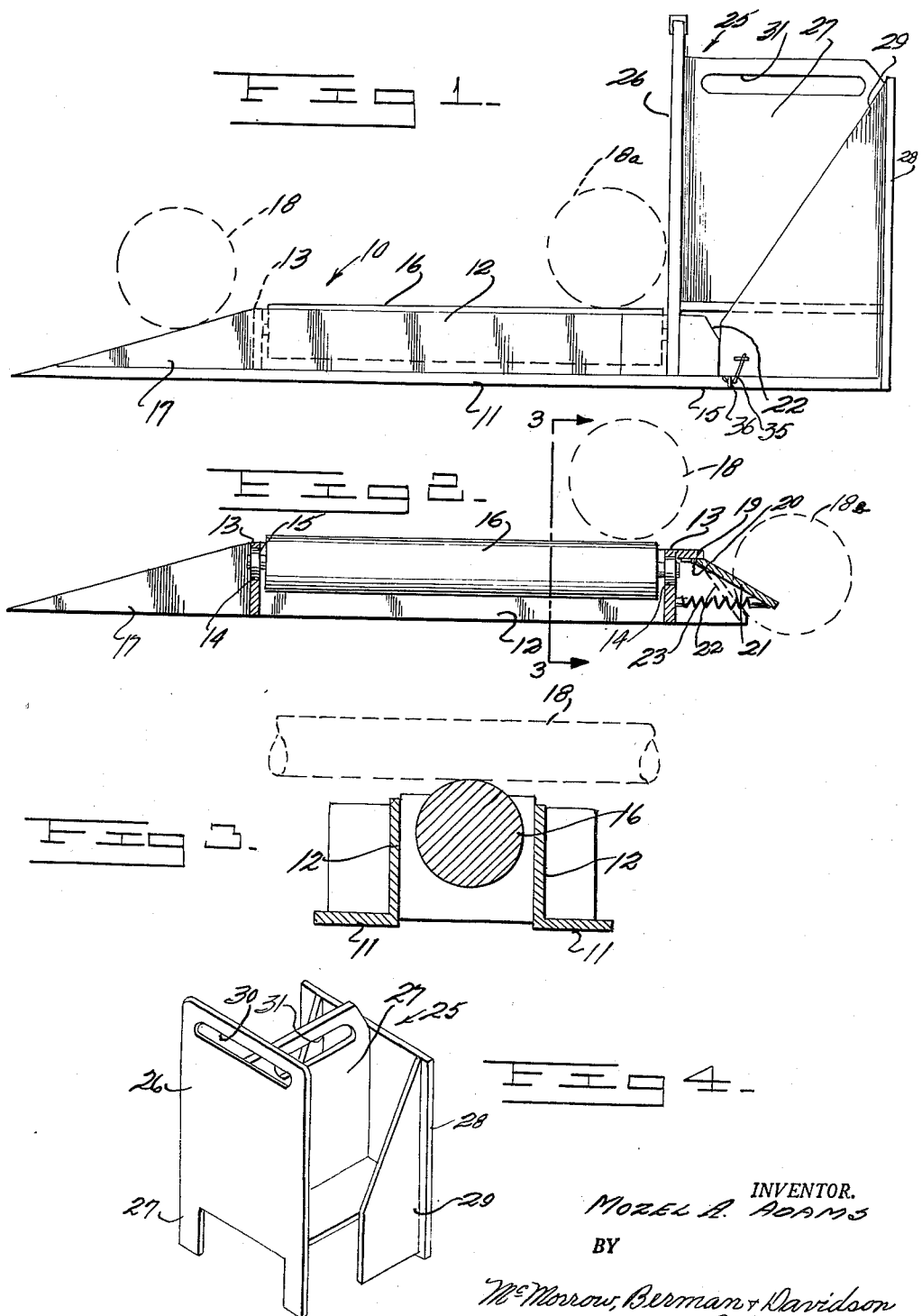

2,531,545

UNITED STATES PATENT OFFICE 2,531,545

PIPE ROLLER

Mozel A. Adams, Evangeline, La., assignor to Tom Crain and Gus P. Modlish, Jefferson Davis Parish, La.

Application April 15, 1947, Serial No. 741,605

6 Claims. (Cl. 214—1)

1

This invention relates to a pipe roller, and more particularly to such a device adapted for the collaring or aligning of the ends of pipes on storage racks or the like.

A primary object of this invention is the provision of an improved pipe roller facilitating the handling of pipes when positioning same on storage racks or the like, in such manner as accurately to align the ends of such pipes, and further, to so position such pipes that the overhang at both ends of the storage racks is substantially identical, thus precluding warping or bending of the pipes, due to uneven overhang.

An additional object of the invention is the provision of such a device provided with spring means at one end thereof, whereby the device is "kicked" forward or forced out from beneath the pipe after the same has been positioned on the storage rack.

Still another object of the invention is the provision of such a device which is sturdy and durable in construction, reliable and efficient in operation, light in weight, portable, easy to use, and relatively simple and inexpensive to manufacture and assemble.

Other objects will in part be obvious and in part be pointed out as the description of the invention proceeds, and shown in the accompanying drawings, wherein there is disclosed a preferred embodiment of this inventive concept.

In the drawings:

Figure 1 is a side elevational view of one form of pipe roller embodying features of the instant invention, certain concealed portions thereof being indicated in dotted lines, a back rest or spacer being shown in position thereon.

Figure 2 is a vertical sectional view taken substantially through the center line of the device of Figure 1, the back rest being removed, and various positions of the sections of pipe being indicated in dotted lines.

Figure 3 is an enlarged sectional view taken substantially along the line 3—3 of Figure 1, as viewed in the direction indicated by the arrows.

Figure 4 is a perspective view of a back rest or spacer utilized in conjunction with the device.

Similar reference characters refer to similar parts throughout the several views of the drawings.

As conducive to a clear understanding of the invention, it may here be pointed out that in the storing of pipes, as for example, those pipes used in oil well drilling, it is important that the ends of the pipe be accurately collared or aligned in storage, and that such pipes be spaced on the supporting racks, which are customarily comprised of two or more heavy timbers transversely extending with respect to the length of the pipe, in such manner that the ends of the pipes overhang the supports equi-distantly, to prevent warping or sagging of the pipes. Heretofore such collaring has been done manually, and in the case of heavy sections of pipe, the services of eight or ten men have been required to align the pipes properly. An important object of this invention is, therefore, the provision of a pipe roller which may be utilized in collaring or aligning the ends of the pipes on such supports, facilitating the longitudinal movement of the pipes, as well as the rolling of the pipes onto the supporting racks, in such manner that two or three men may handle a heavy section of pipe and align the same properly on its support.

Referring now to the drawings in detail, the device of the instant invention comprises a frame generally indicated at 10, including base flanges 11, side walls 12, and end wall portions 13, provided with ball bearings 14, in which are journaled for rotation the ends 15 of a pipe roller 16, the roller 16 seating well within the side walls 12 in such manner that a limited portion thereof extends above the side walls. One end of the device is provided, beyond the end walls 13, with tapered portions 17, forming an incline up which a pipe 18 may be rolled into position on the roller 16.

The opposite end of the device is provided with a horizontally projecting flange 19 to which is hingedly secured, as by a hinge 20, an inclined plate 21 seated in an aperture beyond the inclined ends 22 of the side walls 10. A spring 23 is positioned between the lower extremity of the hinged portion 21, and the associated end wall 13, normally biasing portion 21 outwardly beyond the ends 22 of the device. A back rest or spacer generally indicated at 25 is also provided, and includes a front plate 26, including depending tongue portions 27 adapted, when in assembled relation, to seat in suitable grooves in the side walls 12 of the device adjacent the end walls 13 which carry the flange 19 and its associated hinged plate 21. Plate 26 has secured thereto a spacer plate 27, which carries at its opposite end an additional plate 28, provided with side flanges 29 adapted to seat on the base flanges 11 on the exterior of the portion 22 for securely aligning the back rest 25 with the supporting member 10. Suitable handle portions 30 and 31, comprised of apertures, may be formed in plates 26 and 27, respectively.

From the foregoing the operation of the device should be readily understandable.

When it is desired to collar or align pipes on a storage rack or the like, as for example, such a rack comprised of three transverse timbers, the assembly is positioned on the central timber transversely to the longitudinal axis of the pipe section to be stored, and the section is rolled up the incline 17 onto the roller 16, and thence moved longitudinally over the roller until such time as it is accurately collared or aligned, at which time it is rolled adjacent the plate 26, as indicated in dotted lines at 18a in Figure 1. The back rest 25 is now removed by grasping either of the handles 30 or 31, and the pipe rolled down the inclined section 22 over the portion 21, thus compressing the spring 23, which, when the pipe has assumed the position indicated at 18b in Figure 2, resting on the support, causes the device to be "kicked" outwardly from beneath the pipe, in such manner as to be readily accessible for use with the next pipe section.

Obviously, the back rest 25 may be made in any desired size in accordance with the diameter of the pipe being stacked, and various sizes of substitute back rests may be employed for various specified operations.

Any desired securing means, as for example, a hook 35 carried by the back rest and an eye 36 carried by the member 10, may be employed for securing the two parts in related assembly to facilitate the carrying or transportation of the device as a single unit.

From the foregoing it will now be seen that there is herein provided a device which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a pipe roller, the combination of a base having side walls provided with inclined portions at either end, end walls between the side walls, a roller journaled for rotation between the end walls, a plate hingedly secured adjacent one end wall and extending outwardly at an angle beyond the adjacent inclined portions of the side walls, and a spring between the free end of the plate and the adjacent end wall, said side walls having channels therein, and a spacing back rest adapted to be seated in said channels.

2. In a pipe roller, the combination of a base having side walls provided with inclined portions at either end, end walls between the side walls, a roller journaled for rotation between the end walls, a plate hingedly secured adjacent one end wall and extending outwardly at an angle beyond the adjacent inclined portions of the side walls, and a spring between the free end of the plate and the adjacent end wall, said side walls having channels therein, and a spacing back rest adapted to be seated in said channels, said spacing back rest including two spaced plates, and a perpendicular separator therebetween.

3. In a pipe roller, the combination of a base having side walls provided wtih inclined portions at either end, end walls between the side walls, a roller journaled for rotation between the end walls, a plate hingedly secured adjacent one end wall and extending outwardly at an angle beyond the adjacent inclined portions of the side walls, a spring between the free end of the plate and the adjacent end wall, said side walls having channels, therein, a spacing back rest adapted to be seated in said channels, said spacing back rest including two spaced plates, a perpendicular separator therebetween, and hooks for securing said back rest on said base.

4. In a pipe roller, the combination of a base having side walls provided with inclined portions at either end, end walls between the side walls, a roller journaled for rotation between said end walls, said side walls being formed with upwardly-directed channels in the region of one of said inclined portions, and a spacing back rest adapted to be seated in said channel.

5. In a pipe roller, the combination of a base having side walls provided with inclined portions at either end, end walls between the side walls, a roller journaled for rotation between said end walls, a spacing back rest for said base, and means for readily detachably mounting said back rest on said base between said roller and one of said inclined portions.

6. In a pipe roller, the combination of a flat base provided with front and rear downwardly-inclined portions at the front and rear ends of said base, a roller journaled in said base for rotation between said inclined portions and at right angles thereto, a kicker hingedly secured to said base in the region of said rear inclined portion and extending rearwardly of said base in overlying relation to said rear inclined portion, an expansive spring between said kicker and said base and loading said kicker for rearward kicking movement relative to said base, said kicker being downwardly movable against the action of said spring under the weight of a pipe rolling downwardly over said rear inclined portion, and said spring being operative to move said kicker to kick said base forwardly from such pipe as said kicker is relieved of the weight thereof.

MOZEL A. ADAMS.

REFERENCES CITED

The following references are of record in the file of this patent:

UNITED STATES PATENTS

| Number | Name | Date |
|---|---|---|
| 915,721 | Aldous | Mar. 23, 1909 |
| 1,482,105 | Andrews et al. | Jan. 29, 1924 |
| 1,829,879 | Stephens | Nov. 3, 1931 |
| 2,205,057 | Brady | June 18, 1940 |